US008775429B2

(12) United States Patent
Choudhary et al.

(10) Patent No.: US 8,775,429 B2
(45) Date of Patent: Jul. 8, 2014

(54) METHODS AND SYSTEMS FOR ANALYZING DATA OF AN ONLINE SOCIAL NETWORK

(75) Inventors: Alok Choudhary, Chicago, IL (US); Ramanathan Narayanan, Jersey City, NJ (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 13/438,382

(22) Filed: Apr. 3, 2012

(65) Prior Publication Data
US 2012/0254184 A1 Oct. 4, 2012

Related U.S. Application Data

(60) Provisional application No. 61/471,550, filed on Apr. 4, 2011.

(51) Int. Cl.
*G06F 17/30* (2006.01)

(52) U.S. Cl.
USPC .......................................... 707/738

(58) Field of Classification Search
CPC ............................... G06F 17/30132
USPC ........... 707/101, 738; 705/14.1; 709/204, 206
See application file for complete search history.

(56) References Cited

U.S. PATENT DOCUMENTS

| | | | | |
|---|---|---|---|---|
| 7,596,594 | B2 * | 9/2009 | Karp .............................. | 709/203 |
| 8,214,253 | B1 * | 7/2012 | Harris et al. .................. | 705/14.1 |
| 2004/0128353 | A1 * | 7/2004 | Goodman et al. ............ | 709/204 |
| 2006/0042483 | A1 * | 3/2006 | Work et al. ..................... | 101/91 |
| 2006/0168059 | A1 * | 7/2006 | Chang et al. .................. | 709/206 |
| 2007/0239745 | A1 * | 10/2007 | Guerraz et al. ............... | 707/101 |
| 2013/0007893 | A1 | 1/2013 | Weir et al. | |

OTHER PUBLICATIONS

Arora et al., *Identifying Types of Claims in Online Customer Reviews*, Proceedings of NAACL HLT 2009, pp. 37-40.

Baccianella et al., *Multi-facet Rating of Product Reviews*, Proceeding ECIR '09 Proceedings of the 31th European Conference on IR Research on Advances in Information Retrieval, pp. 461-472, 2009.

Chen et al., *The Impact of Online Recommendations and Consumer Feedback on Sales*, Dec. 2004, ICIS 2004 Proceedings.

(Continued)

*Primary Examiner* — Etienne Leroux
(74) *Attorney, Agent, or Firm* — Klintworth & Rozenblat IP LLC

(57) ABSTRACT

Method of analyzing data from an online social network having a set of network users. The method includes obtaining topic-specific messages sent by the network users. The messages have social content provided by the networks users, wherein the messages include a marker of interest in the social content. The marker of interest is associated with a topic of the social network. The method also includes identifying the network users that sent the messages having the marker of interest in the social content as interested users of the topic. The interested users are a subset of the set of network users. The method also includes determining a topic-specific influence (TSI) value of a designated user from the interested users in the subset. The TSI value of the designated user is based on a number of the interested users that are registered to receive the messages from the designated user.

20 Claims, 5 Drawing Sheets

| Topic | Definition |
|---|---|
| valentine's day | Celebrated annually on February 14th, a day to express to a loved one how much they mean to you by exchanging gifts OR movie coming out in cinemas by the name of "Valentines Day." |
| shawn andrews | Offensive Lineman Andrews was released from the Philadelphia Eagles today |
| air america | Liberal talk-radio network Air America ceased operations as of Jan. 21, 2010 |
| #memyselfandtime | Demi Lovato's new song for Sonny With A Chance |
| earthquake | 5.4 magnitude earthquake in southern california 3 miles off of Hermosa Beach |
| happy lunar new year | Lunar New Year refers to the beginning of the year in several calendars |
| olympics | People are tweeting about the 2010 Vancouver Winter Olympic games in British Columbia, Canada |
| #musicmonday | Music Monday is a tradition where users recommend music they appreciate every Monday |
| ireland | Ireland is trending because today is St Patrick's Day! |

(56) References Cited

OTHER PUBLICATIONS

Hatzivassiloglou et al., *Predicting the Semantic Orientation of Adjectives*, Proceeding ACL '98 Proceedings of the 35th Annual Meeting of the Association for Computational Linguistics and Eighth Conference of the European Chapter of the Association for Computational Linguistics, pp. 174-181, 1997.

He et al., *An Effective Statistical Approach to Blog Post Opinion Retrieval*, CIKM, 10 (2008), pp. 1063-1069.

Hofmann; *Probabilistic Latent Semantic Analysis*, UAI 1999, Stockholm.

Hu et al., *Can Online Reviews Reveal a Product's True Quality? Empirical Findings and Analytical Modeling of Online Word-of-Mouth Communication*, (2006), pp. 324-330, Proceeding EC '06 Proceedings of the 7th ACM Conference on Electronic Commerce.

Hu et al., *Mining and Summarizing Customer Reviews*, Proc. of 10th ACM Int'l Conference on Knowledge Discovery and Data Mining, pp. 168-177, (2004).

Hu et al., *Mining Opinion Features in Customer Reviews*, Proc of the 19th Nat'l Conference on Artificial Intelligence (2004), vol, 7, pp. 755-760.

Hu et al., *Opinion Extraction and Summarization on the Web*, AAAI (2006), pp. 1621-1624.

Jindal et al., *Identifying Comparative Sentences in Text Documents*, SIGIR '06 Proceedings of the 29th Annual International ACM SIGIR Conference on Research and Development in Information Retrieval, 244-251, 2006.

Kendall, *A New Measure of Rank Correlation*, Biometrika Trust, 1938.

Kim et al., *Automatically Assessing Review Helpfulness*, Proceeding EMNLP '06 Proceedings of the 2006 Conference on Empirical Methods in Natural Language Processing, pp. 423-430, (2006).

Liu et al., *Modeling and Predicting the Helpfulness of Online Reviews*, Eighth IEEE International Conference on Data Mining, 2008. ICDM '08. (2008), pp. 443-452.

Liu et al., *Opinion Observer: Analyizing and Comparing Opinions*, WWW '05 Proceedings of the 14th International Conference on World Wide Web, (2005), pp. 342-351.

Liu et al., *Text Classification by Labeling Words*, AAAI, 2004, pp. 425-430.

Liu, *Sentiment Analysis and Subjectivity*, Handbook of Natural Language Processing Second Edition, 2010, pp. 627-661.

Lu et al., *Rated Aspect Summarization of Short Comments*, Proceedings of the 18th international Conference on World Wide Web, pp. 131-140, 2009.

Page et al., *The PageRank citation ranking: Bringing Order to the Web*, Stanford University, Jan. 1998.

Pang et al., *Thumbs up? Sentiment Classification using Machine Learning*, EMNLP (2002), pp. 79-86.

Popescu et al., *Extracting product features and opinions from reviews*, Proceedings of the Conference on Human Language Technology and Empirical Methods in Natural Language Processing, (2005), pp. 339-346.

Ratnaparkhi, *A Maximum Entropy Model for Part-of-Speech Tagging*, In Proceedings of the Empirical Methods in Natural Language Processing (1996), pp. 133-142.

Reynar et al., *A Maximum Entropy Approach to Identifying Sentence Boundaries*, In Proceedings of the Fifth Conference on Applies Natural Language Processing; pp. 16-19 (1997).

Zhang et al., *Mining Online Customer Reviews for Ranking Products*, CUCIS Technical Report, EECS dept, Northwestern University, 2009.

Wordnet: An Electronic Lexical Database, edited by Christiane Fellbaum, MIT Press, May 1998 (Brief Description).

*Online Consumer-Generated Reviews Have Significant Impact on Offline Purchase Behavior*, study conducted by comScore and The Kelsey Group, Nov. 2007.

CRFTagger: CRF English POS Tagger, (2007) (Brief Description).

MPQA Releases, website archived in Jul. 2011, retrieved from archive.org (http://web.archive.org/web/20110720030612/http://www.cs.pitt.edu/mpqa/).

*Online Sales to Climb Despite Struggling Economy According to Shop.org/Forrester Research Study*, Apr. 2008, http://www.shop.org/c/journal_articles/view_article_content?groupId=18,articleId=702&,version=1.0.

Christopher D. Manning and Hinrich Schütze, *Foundations of Statistical Natural Language Processing*, The MIT Press, Jun. 1999 (One paragraph summary and table of contents) (4 pages).

Jindal et al., *Mining Comparative Sentences and Relations*, Proceeding AAAI'06 proceedings of the 21st national conference on Artificial intelligence, 2006.

Reichheld, *The One Number You Need to Grow*, Harvard Business Review, Dec. 2003.

Kim et al., *Automatically Assessing Review Helpfulness*, Proceedings of the 2006 Conference on Empirical Methods in Natural Language Processing (EMNLP 2006), pp. 423-430, Sydney, Jul. 2006.

Jindal et al., *Mining Comparative Sentences and Relations*, AAAI, (2006).

R. Agrawal, S. Rajagopalan, R. Srikant, and Y. Xu. Mining newsgroups using networks arising from social behavior. In Proceedings of the 12th international conference on World Wide Web, pp. 529-535. ACM New York, NY, USA, 2003.

S. Asur and B.A. Huberman. Predicting the future with social media. Arxiv preprint arXiv:1003.5699, 2010.

C. Bird, A. Gourley, P. Devanbu, M. Gertz, and A. Swaminathan. Mining email social networks. In Proceedings of the 2006 international workshop on Mining software repositories, p. 143. ACM, 2006.

P. Domingos and M. Richardson. Mining the network value of customers. In Proceedings of the seventh ACM SIGKDD international conference on Knowledge discovery and data mining, pp. 57-66. ACM New York, NY, USA, 2001.

P. Farhi. The Twitter explosion. American Journalism Review, 31(3):26-31, 2009.

JA Hartigan and MA Wong. A k-means clustering algorithm. JR Stat. Soc., Ser.C, 28:100-108, 1979.

T.H. Haveliwala. Topic-sensitive pagerank: A context-sensitive ranking algorithm for web search. IEEE transactions on knowledge and data engineering, pp. 784-796, 2003.

B.J. Jansen, M. Zhang, K. Sobel, and A. Chowdury. Twitter power: Tweets as electronic word of mouth. Journal of the American society for information science and technology, 60(11):2169-2188, 2009.

A. Java, X. Song, T. Finin, and B. Tseng. Why we twitter: understanding microblogging usage and communities. In Proceedings of the 9th WebKDD and 1st SNA-KDD 2007 workshop on Web mining and social network analysis, pp. 56-65, ACM, 2007.

D. Kempe, J. Kleinberg, and E. Tardos. Maximizing the spread of influence through a social network. In Proceedings of the ninth ACM SIGKDD international conference on Knowledge discovery and data mining, pp. 137-146. ACM, 2003.

D. Kempe, J. Kleinberg, and E. Tardos. Influential nodes in a diffusion model for social networks. Automata, Languages and Programming, pp. 1127-1138, 2005.

B. Krishnamurthy, P. Gill, and M. Arlitt. A few chirps about twitter. In Proceedings of the first workshop on Online social networks, pp. 19-24. ACM, 2008.

P.V. Marsden and N.E. Friedkin. Network studies of social influence. Advances in social network analysis: Research in the social and behavioral sciences, pp. 3-25, 1994.

S. Milstein, A. Chowdhury, G. Hochmuth, S. Lorica, and R. Magoulas. Twitter and the micro-messaging revolution: Communication, connections, and immediacy 140 characters at a time, 2008.

L. Page, S. Brin, R. Motwani, and T. Winograd. The pagerank citation ranking: Bringing order to the web. 1998.

W. Reinhardt, M. Ebner, G. Beham, and C. Costa. How people are using Twitter during conferences. In Hornung-Prahauser, V., Luckmann, M.(Hg.): 5th EduMediaconference, Salzburg, pp. 145-156. Citeseer, 2009.

(56) References Cited

OTHER PUBLICATIONS

Alexander Strehl, JoydeepGhosh, and Claire Cardie. Cluster ensembles—a knowledge reuse framework for combining multiple partitions. Journal of Machine Learning Research, 3:583-617, 2002.
"W.M.P. Van der Aalst and M. Song. Mining Social Networks: Uncovering interaction patterns in business processes. Lecture Notes in Computer Science, pp. 244-260, 2004."

J. Weng, E.P. Lim, J. Jiang, and Q. He. Twitterrank: finding topic-sensitive influential twitterers. In Proceedings of the third ACM international conference on Web search and data mining, pp. 261-270. ACM, 2010.

W. Xing and A. Ghorbani. Weighted pagerank algorithm. 2004.

* cited by examiner

| Topic | Definition |
|---|---|
| valentine's day | Celebrated annually on February 14th, a day to express to a loved one how much they mean to you by exchanging gifts OR movie coming out in cinemas by the name of "Valentines Day." |
| shawn andrews | Offensive Lineman Andrews was released from the Philadelphia Eagles today |
| air america | Liberal talk-radio network Air America ceased operations as of Jan. 21, 2010 |
| #memyselfandtime | Demi Lovato's new song for Sonny With A Chance |
| earthquake | 5.4 magnitude earthquake in southern california 3 miles off of Hermosa Beach |
| happy lunar new year | Lunar New Year refers to the beginning of the year in several calendars |
| olympics | People are tweeting about the 2010 Vancouver Winter Olympic games in British Columbia, Canada |
| #musicmonday | Music Monday is a tradition where users recommend music they appreciate every Monday |
| ireland | Ireland is trending because today is St Patrick's Day! |

FIG. 1

METHODS AND SYSTEMS FOR ANALYZING DATA OF AN ONLINE SOCIAL NETWORK

CROSS REFERENCE TO RELATED APPLICATIONS

The present application claims the benefit of U.S. Provisional Patent Application No. 61/471,550, filed on Apr. 4, 2011, which is incorporated by reference in its entirety.

BACKGROUND

The subject matter described and/or illustrated herein relates generally to systems, methods, and computer readable media for mining and analyzing data from a social network and, more particularly, identifying influential users in the social network or and/or related topics of the social network.

Online social networks provide a platform for a number of users of the social network to interact with other users through electronic communication. Examples of such social networks include Twitter, Facebook, MySpace, Friendster, LinkedIn, Google+, and Orkut. Social networks may enable users to create personal profiles that can be accessed by other users. Social networks may also allow users to send and receive messages to share ideas, activities, events, pictures, and interests with other users of the social network. For example, Twitter allows users to send and receive messages called "tweets." The messages typically include text, but pictures may also be sent. Users send and receive messages that are related to various topics such as current events, sports, movies, natural disasters, political protests, celebrities, technology, and personal interests. Users of the social networks also may search for messages from other users that are related to a particular topic. For example, if a user was interested in monitoring messages about a recent national disaster or a favorite musical group, the user could search for messages having the desired topic on the social network.

In some social networks, users may be "followers" of other users. More specifically, user A may follow user B in that user A is subscribed to receive messages that are posted by user B, but not necessarily sent only to user A or directed to user A. In such cases, user B may be characterized as having influence over user A (and other users that follow user B) because user A has agreed to receive messages from user B. Generally, the more followers that a user has on a social network, the more influence the user is perceived to have in the social network. For a user who is only followed by close family and friends, or a relatively small number of other users, his or her influence may be limited. Other users may have a greater influence, such as celebrities, musical groups, and political nominees, due to their larger number of followers.

Given the popularity of social networks and the vast amounts of information that is communicated each day in the social networks, various academic studies have been performed to study the interaction between users of a social network. For example, researchers have sought to develop metrics for identifying those users who have more influence (hereinafter referred to as "influential users"). But, academic researchers are not the only ones interested in the dynamics of social networks. For instance, businesses also may wish to identify influential users. Businesses could hire the influential users of the social network to write a positive message about the business or a positive review of a product or service that the business manufactures or provides. In particular, businesses may wish to identify users who are influential with respect to a specific topic. For example, a user of the social network who posts messages about cancer research may not be considered influential to the general public, but may have influence with those in the area of cancer research who read the messages from the user.

Another capability that is desired by academics and businesses is the ability to effectively identify related topics on a social network. Knowing the topics that are related to each other, businesses could use this information to provide better services to customers or market more effectively to potential customers. For example, if a store learns that users of the social network are interested in school supplies and a particular television show, then the store may wish to advertise a back-to-school sale during commercials of that television show.

Accordingly, a need exists to identify influential users of a social network, including topic-specific influential users, and/or related topics of the social network.

BRIEF DESCRIPTION

In one embodiment, a method of analyzing data from an online social network having a set of network users is provided. The network users are capable of communicating with one another through the social network. The method includes obtaining topic-specific messages sent by the network users. As used herein, a "message" may include social content and/or metadata. The social content of the message can include an expression(s) from a network user that is intended to be communicated to another network user. For example, the expressions may include textual content and/or images. The textual content may be expressions written (e.g., typed) by an individual or expressions voiced by the individual that are transcribed into textual content. The terms "textual content" and "expressions" are not intended to be limiting. For example, textual content not only includes textual terms that form complete and grammatically correct sentences, but also includes textual terms that may not satisfy established standards or etiquette. Textual content (or textual terms) may be a single word, multiple words, words that form a clause or sentence, misspelled word(s), emoticon(s), slang, abbreviation(s), etc. Images may be pictures or video (including gifs, animation, etc.). In some cases, the images are not viewed directly from the message but are connected to the message through a link in the message. If the network user that received the message activates the link, the image may then be displayed to the network user. Expressions may also include sound files. The sound files may include recordings from the network user that sent the message or recordings from third parties (e.g., songs, famous movie lines).

As used herein, "metadata" includes data that describes the data of the message and/or the network user that sent the message. Metadata may not be perceivable in the message by the network user that receives or views the message. In some cases, however, the network user that sent the message or received the message may be able to view the metadata by taking affirmative steps (e.g., selecting options to view the metadata) in addition to merely viewing the message upon receipt or posting. By way of example, metadata may include one or more of an identification number (e.g., 17932456) that correlates to the identification of the network user that prepared the message (e.g., author of the message); a message identifier (e.g., number) that identifies a message with respect to all other messages in the social network including other messages provided by the network user that sent the message; creation date (e.g., day, month, year, and time of day) of the message; modification date(s) of the message that correspond to dates when the message was changed; biographical or personal information about the network user (e.g., age, gender, ethnicity); a uniform resource locator or universal resource locator (URL) that corresponds to an address of the network user (e.g., the network user's webpage on the social network); creation date of the network user's account; number of other network users that the network user is registered to receive messages from; number of other network users that are registered to receive messages from the network user; the network user's selected language; a level of permissions or protections that the user has selected for the message (e.g., the message is only intended to be read by family members); a location from which the message was sent (e.g., at least one of a building, street location, city, state, region, country); data regarding the user interface that sent the message (e.g., the user interface provided by the social network or the user interface provided by a third party application); and the like.

The messages may have social content provided by the networks users, where the messages include a marker of interest (otherwise referred to herein as a key marker) in the social content. As used herein, a "marker of interest" or key marker includes an identifiable or designated term, word, phrase, number, symbol, or image (including a portion of an image) in the message or in the metadata of the message. The key marker(s) may be used to identify a characteristic of the message, such as a topic of the message. For example, the marker of interest may be a textual term that is associated with or correlates to a social topic. If the marker of interest includes textual content, the textual content may include one word or a phrase. More than one marker of interest may be identified in a message.

The key marker can be associated with a topic of the social network. The method also includes identifying the network users that sent the messages having the key marker in the social content as interested users of the topic. The interested users are a subset of the set of network users. The method also includes determining a topic-specific influence (TSI) value of a designated user from the interested users in the subset. The TSI value of the designated user is based on a number of the interested users that are registered to receive the messages from the designated user.

In another embodiment, a system configured to analyze data from an online social network having a set of network users is provided. The network users are capable of communicating with one another through the social network. The system includes an analysis module configured to analyze messages sent by the network users. The messages have social content that includes at least one of textual terms or images provided by the networks users. The messages include a key marker in the social content. The key marker is associated with a topic of the social network. The system also includes an identification module that is configured to identify the network users that sent the messages having the key marker in the social content as interested users of the topic. The interested users are a subset of the set of network users. The system also includes a value-generating module that is configured to determine a topic-specific influence (TSI) value of a designated user from the interested users in the subset. The TSI value of the designated user is based on a number of the interested users that are registered to receive the messages from the designated user.

In a further embodiment, a non-transitory computer readable medium configured to rank commercial products or services is provided. The computer readable medium includes instructions to command a processor to analyze messages sent by the network users. The messages include social content that has at least one of textual terms or images provided by the networks users. The instructions also command the processor to determine whether the messages include a key marker in the social content. The key marker is associated with a topic of the social network. The instructions also command the processor to identify the network users that sent the messages having the key marker in the social content as interested users of the topic. The interested users are a subset of the set of network users. The instructions also command the processor to determine a topic-specific influence (TSI) value of a designated user from the interested users in the subset. The TSI value of the designated user is based on a number of the interested users that are registered to receive the messages from the designated user.

BRIEF DESCRIPTION OF THE DRAWINGS

FIG. 1 is a table showing various topics that were popular on a social network during one day and the reasons for the popularity of the topics.

DETAILED DESCRIPTION

Figure 2:
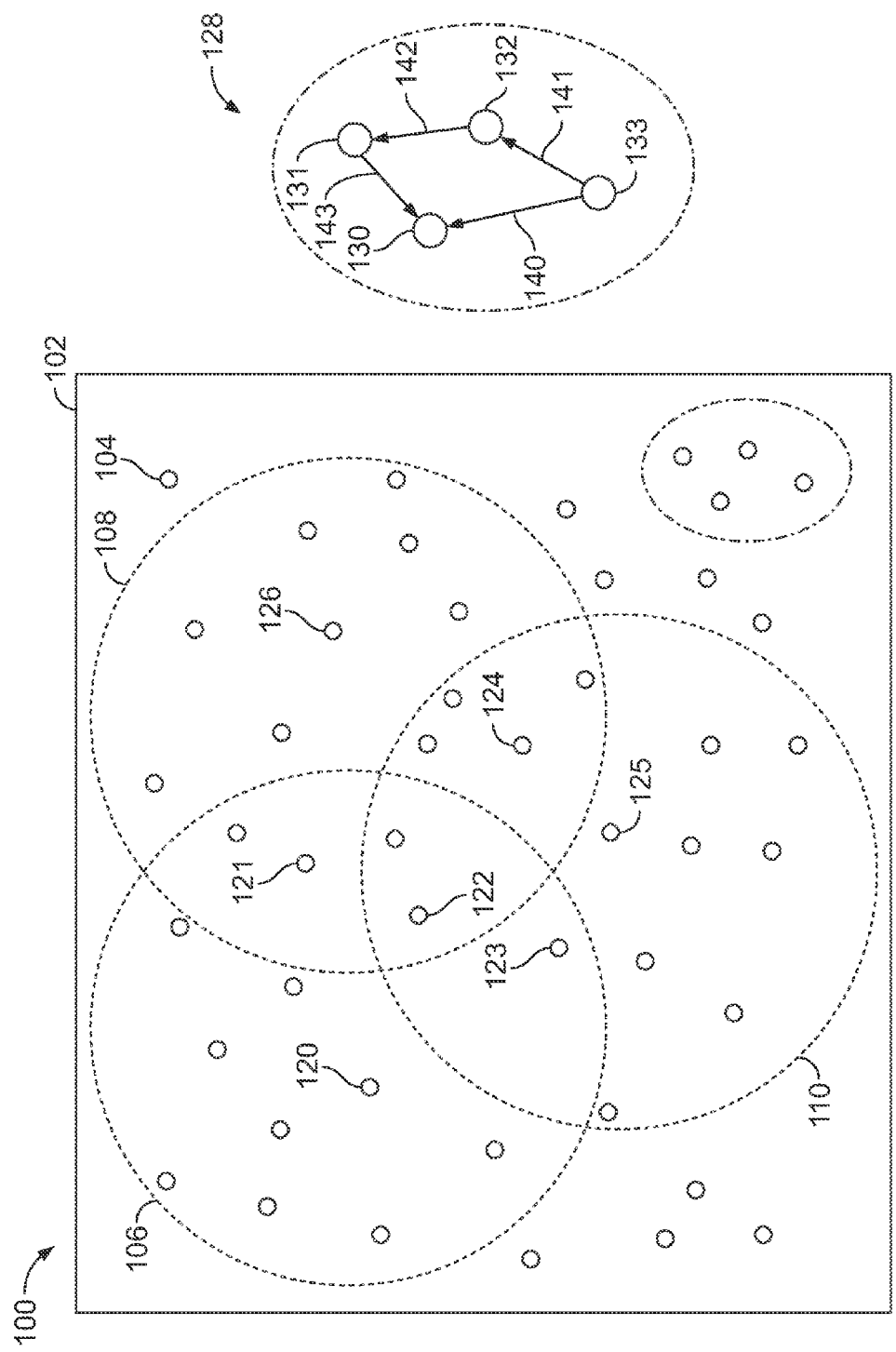
FIG. 2 is a diagram illustrating the various relationships and types of users on a social network in accordance with one embodiment.

The following detailed description of certain embodiments will be better understood when read in conjunction with the appended drawings. To the extent that the Figures illustrate diagrams of functional blocks of various embodiments, the functional blocks are not necessarily indicative of the division between hardware. Thus, for example, one or more of the functional blocks may be implemented in a single piece of hardware or multiple pieces of hardware. It should be understood that the various embodiments are not limited to the arrangements and instrumentality shown in the drawings. Additionally, the system blocks in the various Figures or the steps of the methods may be rearranged or reconfigured.

As used herein, an element or step recited in the singular and proceeded with the word "a" or "an" should be understood as not excluding plural of said elements or steps, unless such exclusion is explicitly stated. Furthermore, references to "one embodiment," "an exemplary embodiment," "some embodiments" and the like are not intended to be interpreted as excluding the existence of additional embodiments that also incorporate the recited features. Moreover, unless explicitly stated to the contrary, embodiments "comprising" or "having" an element or a plurality of elements having a particular property may include additional such elements that do not have that property.

Embodiments described herein may analyze data of an online social network to identify various characteristics or features of the social network. For instance, data derived from communications may be analyzed to identify one or more influential users of the social network and/or to identify related topics on the social network. The data analyzed include messages provided by the social network users, or "network users." The messages may be analyzed for social content that is provided in the message (e.g., text or images) and may also be analyzed for metadata (e.g., information attached to the message that is about the message and/or the user that is not generally viewable in the message). In various embodiments, the messages may be analyzed to identify if a marker of interest exists in the message. Markers of interest, as described in greater detail below, may be textual terms (e.g., words or phrases), symbols, images, or a combination thereof that are associated with a message topic. A marker of interest may also be identified in the metadata. The messages that correspond to a designated topic and data about the users that provided the messages of the designated topic may be further analyzed to determine influential users and/or related topics. The messages relating to the designated topics and the corresponding users may also be analyzed to identify other features of the social network.

As used herein, an "online social network" includes an online platform, website, and/or application that enables individuals that are users of the social network (or network users) to communicate electronically with one another through the network and/or through third party applications that are designed to interface with the social network. Non-limiting examples of online social networks include Twitter, Facebook, MySpace, Friendster, LinkedIn, Google+, and Orkut. As will be described in greater detail below, social networks allow users to be communicatively linked to other users so that messages posted from one network user are sent to and received by, or otherwise available for viewing or consumption by, other network user(s). As used herein, the term "receive" (and forms thereof), may include a user obtaining a message sent to the user, the user viewing a message that is posted or otherwise published for viewing on a website, but not necessarily sent directly to the user, and the like. Social networks may include user interfaces that enable the network users to view messages from other network users and/or post messages for other network users to view. In many cases, the network user has a webpage that is generated by the social network and modified with information that is input by the network user.

In many social networks, a particular network user (also referred to as a "designated user") can determine user relationships with one or more other network users. In particular, the designated user may choose or decide a level of communication to allow with other network users. For example, the designated user can decide whether messages sent by another user will be received by the designated user or viewable to the designated user. A designated user may also be able to decide whether another network user can view the designated user's profile (e.g., webpage with personal information about the designated user) and/or view or receive messages from the designated user. In some cases, the designated user may choose from various levels of user relationships. For instance, the designated user may decide to establish different levels of communication with family members, friends, and coworkers. As one example, a first network user having the user relationship of "family" may not be able to receive or view the same messages as a second network user that has the user relationship of "friend." These various levels of communication with different users can be customized or otherwise controlled by the designated user such that the designated user does not need to individually control how each individual message is handled and/or who can view or receive each individual message.

One or more embodiments may be directed to online social networks that have a large number of network users. By way of example, a number of network users may be more than about 100,000, more than about 1,000,000, more than about 10,000,000, or more. However, in other embodiments, a number of network users may be less than 100,000.

As used herein, "a user interface" may be provided by the social network's platform/website/application or may be provided by a third party application. For example, Twitter allows third party applications to communicate with an application programming interface (API) of Twitter so that network users may send and receive messages through a user interface provided by the third party. As one example, the third party application Seesmic allows network users to manage multiple social network accounts in addition to Twitter. The user interface is typically configured for the network user of the user interface to view messages from other network users and/or send messages to other network users. In addition to permitting network users to communicate with other network users, the user interface may provide games (e.g., Angry Birds or Words with Friends) and tools or services (e.g., stock tracker or news feed) that are accessible through the user interface.

Social networks may allow network users to develop a user profile (or personal profile) that is accessible to other individuals of the social network. The user profile may include a username, biographical information about the individual (e.g., name, gender, age, and location), and personal preferences. For example, the network user's webpage on the social network may not only include a name of the network user, but may also include personal information that is not available through public records such as personal interests, dating status, favorite songs, movies, and foods. The user profile may also include messages or links to messages that have been provided by the network user.

The individual associated with a network user is not necessarily an exclusive user of one social network. For example, individuals may have user profiles on multiple social networks (e.g., Twitter and Facebook) and use an application to monitor both at the same time (e.g., Seesmic). Moreover, one individual may control multiple users of a single social network. For example, a celebrity may control a network user that is intended to be accessible to fans while another network user is intended to be communicated with by close family and friends. It should be noted that the individual associated with a network user may be a human being or an entity, such as a business or non-profit organization. For example, a television show (e.g., The Daily Show), local restaurant, or business (e.g., Siemens) may operate a network user of the social network to communicate with fans, restaurant patrons, or clients/customers, respectively.

As used herein, a "set of network users" may include all network users (e.g., all account members of the social network) of a social network or a limited number of network users of a social network, such as a subset of a larger set (e.g., all users of the social network). A limited set of network users may include network users that have a common characteristic. For example, the limited set may not include users that do not have the common characteristic. The common characteristic may be provided by or associated with the network user. By way of example, a set of network users may be limited or filtered by geography or location (e.g., New York, Rocky Mountains, Los Angeles), demographics (e.g., gender, ethnicity, age), common hobbies or interests (e.g., musical group, rock climbing), an organization (e.g., political party, employer), etc. The above limitations on a set may be determined by analyzing user profiles, social content of the messages from the network users, or metadata of the messages. It should be noted that a set of network users may be dynamic such that a number of network users in the set is capable of changing. For example, a network user may define a set of users in a social network to include those who are "fans" of a topic (e.g., users who have expressed an interest in a topic such as the Star Wars movies). As other users of the social network who are fans of the same topic join the social network, leave the social network (e.g., de-register from the social network), or change whether they are fans of the topic, the set of users may autonomously change to reflect the changing users.

As noted above, a set of network users may technically be a sub-set of a larger set of network users. Sets (or subsets) may be further limited or filtered. For example, it may be desirable to split a set of network users that are associated with a city (e.g., New York City) into multiple sub-sets by identifying the local sports teams that the network users of the set follow (e.g., Mets or Yankees). As before, the identification may be through analyzing the messages of the network users or user profiles.

As used herein, a first network user is "registered to receive" messages from a second network user when the first network user has agreed to receive messages from the second network user. In such a relationship between the first network user and the second network user, the first network user can be referred to as a subscribing network user and the second network user can be referred to as a publishing network user. If the second network user registers to receive messages from the first network user (or another network user), then the second network user may also be referred to as a subscribing network user and the first network user (or the other network user) may also be referred to as a publishing network user. Thus, a single network user may have multiple relationships with another network user. When the subscribing network user has agreed to receive the messages, the subscribing network user may be characterized as being enrolled with the publishing network user or subscribed to the publishing network user (e.g., subscribed to the "feed" of messages posted by the publishing network user). The agreement may be the result of an affirmative step or action taken by the subscribing network user. For instance, the subscribing network user may, upon receiving a request from the publishing network user, select an option that indicates the subscribing network user would like to receive messages from the publishing network user. As one specific example, a box may appear at the user interface of the subscribing network user and include the question "Would you like to receive messages from John Doe?" and provide options for the network user to accept or decline the invitation. Alternatively, the subscribing network user may send a request to the publishing network user that seeks permission for the subscribing network user to receive messages from the publishing network user. Similarly, the request may cause a box to appear to the publishing network user and include the question "Do you accept Jane Doe's request to subscribe to your account?"

But, the affirmative step or action in seeking to subscribe or register to the account or feed of another user may not require a direct communication or interaction with the other network user. For example, the subscribing network user may search for the publishing network user (e.g., by searching for the name of the publishing network user, topics about which the publishing network user frequently writes messages, groups or sets to which the publishing network user belong or subscribes, geographic locations to which the publishing network user is associated, and the like). Upon finding the publishing network user and without communicating directly with the publishing network user, the subscribing network user may select or otherwise indicate to the social network that the subscribing network user would like to receive or view messages written by the publishing network user. For example, the subscribing network user may configure the user account of the subscribing network user so that the subscribing network user receives messages from a comedian or political pundit (e.g., the publishing network user).

It should be noted that when the subscribing network user is registered to receive messages from a publishing network user, the subscribing network user may or may not receive all messages provided by the publishing network user. The subscribing network user may only be selected to receive messages regarding a particular topic from the publishing network user. For example, if the publishing network user is a host of a popular radio or television program about cooking, the subscribing network user may choose to only receive messages that include recipes from the show as opposed to daily messages regarding other topics discussed on the program. Additionally, the publishing network user may choose to only send certain messages to the subscribing network user. For example, the publishing network user may be a young adult that chooses to send certain messages to his or her parents (e.g., to a first subset of users) and different messages to his or her friends (e.g., to a different, overlapping or non-overlapping second subset of users). The publishing network user can control which messages are sent to the different subsets of users on a message-by-message basis, and/or by establishing rules that control which subsets of users are able to view different messages.

The social content of a message in a social network can be written, imaged, recorded, or otherwise prepared by a network user. Messages prepared by the network user may also be forwarded messages that are not the original work of the network user but, nonetheless, were approved and/or sent by the network user to one or more other users or otherwise posted or available for viewing on the social network. In some embodiments, the textual content of the message may have a designated length. For example, messages in Twitter are limited to 140 characters. In other embodiments, however, the messages may be much longer or shorter. For example, the messages may include lengthy articles.

A message provided by a network user may be categorized or identified as being associated with one or more characteristics based on a marker of interest (which also may be referred to as a key marker) that is identified with the message.

In some embodiments, the marker of interest is located within the social content of the message. For example, a system capable of processing/analyzing the social content of the message, such as the data mining system 304 described with respect to FIG. 5, may analyze the social content of numerous messages to identify whether one or more designated markers of interest are located in the social content of the messages. If the marker of interest is a textual term (e.g., word or phrase), the system may analyze the textual content for the marker of interest. If the marker of interest is an image, the system may analyze the image to identify, for example, a portion of the image, a name of an image, or another identifier that is attached to the image.

Messages from network users may be associated with one or more topics, such as social topics. As used herein, the term "social topic" or "topic" is not intended to be limiting and may include any subject that one person would desire to communicate to another person. FIG. 1 provides a few examples of popular social topics that may be communicated in messages on a social network. FIG. 1 also provides a definition or suggested reason for why the topics were popular (e.g., communicated at a frequency that exceeds a designated threshold) at the time. The topics and the definitions shown in FIG. 1 were obtained from the website whatthetrend.com. In some embodiments, a topic of the message may not be literally or explicitly provided in the message, but marker of interests that are strongly associated with the topic may be in the message. For example, in the message "just saw RG3 at the combine" may refer to the National Football League's Scouting Combine where invited athletes are tested for their potential in the football league. The term "RG3" is a reference to Robert Griffin III, an athlete who was tested at the combine, and may be another topic of the message. As other examples, if an image is sent with the message (or as the message) the name of the image or the subject of the image may be the topic of the message. Likewise, if a sound file is sent with a message, the title of the sound file or the subject of the sound file may be one of the topics. For example, if a political candidate committed a verbal gaffe, a sound file of the verbal gaffe may be forwarded to network users on the social network.

One or more embodiments may be directed to identifying relatively popular topics in the messages of the social network. For example, the top 1000 topics of the day on the social network may be identified by the social network, a third party (e.g., whatthetrend.com), or by one or more embodiments described herein. Analysis of the messages may include searching for marker of interests associated with the top 1000 topics. However, in other embodiments, less popular topics may be considered.

As used herein, a message is "identified as being associated with a social topic" (and like phrases), when the message includes textual terms, images, or sounds that are identified as marker of interests associated with a social topic. For example, messages may be analyzed to see if designated keywords or phrases are used. If the message includes one of the keywords or phrases, the message is identified as being associated with the social topic. However, it is understood that the message, upon further analysis, may not in fact relate to the social topic due to word-sense disambiguation. For instance, various words may be confused or incorrectly identified because the word is a polyseme, homonym, or a homograph. The term "bear" may be used in the context of the animal or may be used in describing the stock market or the economy (e.g., "It's a bear market."). "Cricket" may refer to the game that uses a bat and a ball or the term may refer to the insect.

In some embodiments, at least one or more of the topics of a message is designated (e.g., tagged) by the network user that authored the message. More specifically, the network user may act to designate the topic of the message. For example, in Twitter and other social networks, a textual term (e.g., word or phrase) may be designated as at least one of the topics of the message by positioning a symbol (e.g., the hash sign #) in front of the textual term. However, other mechanisms of tagging by the network user may be used. For example, a different symbol other than the hash sign may be used. Also the term may be underlined or have another font/formatting change that indicates the term is tagged. However, other actions initiated by the network user may be performed to indicate the topic. A network user may also place the topic in a designated topic area (e.g., the subject line) thereby indicating the teem is a topic of the message.

One or more embodiments described herein are configured to determine related (or similar) topics. Topics may be related in various manners. For example, two topics may be related because the two topics are strongly associated with the same place or thing. The topic "krishna" and the topic "Janmashtami" are related because the terms refer to the same festival. The topic "World Series" and "Game 6" may be related because, at the time, the World Series was occurring and Game 6 was the next game to be played, The topics "tsunami" and "Pacific tsunami" are related because the topics include a common descriptor ("tsunami"). The topic "earthquake" may also be related to these two terms because the earthquake may have caused the tsunami.

However, in other cases, two topics may not be related even though the two topics use the same or similar word. As mentioned above, word-sense disambiguation may result in two topics appearing to be related even though the two are not. For data mining algorithms that rely solely on or overemphasize keywords and phrases as defining a document, word-sense disambiguation may result in grouping together documents that are not related. Accordingly, one or more embodiments may address the limitations of known data mining techniques by considering other similarities between topics, users, and messages.

FIG. 2 is a diagram showing the different relationships and types of users on a social network 100 and also illustrates different concepts that are relevant to one or more embodiments. FIG. 2 illustrates a set 102 of network users 104 of the social network 100. Networks users 104 may be further classified as types (or sub-types) of users. For example, as will be described in greater detail below, a network user 104 can be characterized as being at least one of an interested user, a non-interested user, a primary user, a secondary user, an influential user, or a spam user. The network users 104 may also be described as a "follower" or a "user-friend." In order to distinguish between users, different network users may also be characterized as an interested follower or user-friend, a non-interested follower or user-friend, a primary follower or user-friend, a secondary follower or user-friend, or an influential follower or user-friend.

As shown in FIG. 2, the set 102 is represented by a square that encloses the network users 104. As described above, the set 102 may represent all network users of the social network 100 or a sub-set of the network users. For example, the set 102 may represent all network users within a designated age group. Three overlapping circles 106, 108, and 110 enclose a select number of network users 104. Each of the network users 104 in the circle 106 represents a network user 104 that has been identified as having a designated characteristic. Each of the network users 104 in the circle 108 represents a network user 104 that has been identified as having a designated characteristic that is different than the designated characteristic associated with the circle 106. Each of the network users 104 in the circle 110 represents a network user 104 that has been identified as having a designated characteristic that is different than the respective designated characteristics associated with the circles 106 and 108. In particular embodiments, the designated characteristics are social topics in the social network that are identified as being associated with at least some of the network users 104. If a network user 104 has been identified as being associated with a corresponding topic, then the network user may be characterized as an interested user of the topic. As used hereafter, the topics associated with circles 106, 108, and 110 may be referred to as topics 106, 108, 110.

More specifically, network users 120-126 are network users 104 that have been identified as interested users of at least one of the topics 106, 108, 110. The network users 120-123 have shown interest in the topic 106, the network users 121, 122, 124, and 126 have shown interest in the topic 108, and the network users 122-125 have shown interest in the topic 110. As illustrated, at least some of the network users are interested in more than one topic. For example, the network user 124 has been identified as being interested in the topic 108 and the topic 110, but is a non-interested user with respect to the topic 106. The network user 121 is an interested user with respect to the topics 106, 108, but is a non-interested user with respect to the topic 110. The network user 122 is interested in all three topics 106, 108, 110.

At 128, an enlarged portion of the set 102 of network users 104 is shown and includes, specifically, network users 130-133. Directed links or edges 140-143 are also shown as connecting or joining corresponding network users 130-133. Each of the edges 140-143 joins a pair of network users and represents that the pair of network users are communicatively linked. For example, the edge 140 is an arrow that points from the network user 133 to the network user 130. In this case, the network user 133 is characterized as being a follower of the network user 130, and the network user 130 is characterized as being a user-friend of the network user 133. The edge 141 extends from the network user 133 to the network user 132. Thus, the network user 133 is a follower of the network user 132, and the network user 132 is a user-friend of the network user 133. With respect to the edge 142, the network user 132 is a follower of the network user 131, and the network 131 is a user-friend of the network user 132. Likewise, as represented by the edge 143, the network user 131 is a follower of the network user 130, and the network 130 is a user-friend of the network user 131.

Both of the network users 131, 133 are registered to receive messages from the network user 130. For example, if the network user 130 posts (e.g., sends) a message and the network users 131, 133 are permitted to have access to the message, then the message may be read by the network users 131, 133. The message may have an identifiable social topic as described above. In FIG. 2, the network user 131 is a primary follower of the network user 130 because the network user 131 is registered to receive messages from the network user 130. The network user 132 is a secondary follower of the network user 130, because the network user 132 is not directly linked to the network user 130 but indirectly linked to the network user 130 via the network user 131. More specifically, the network user 132 is not configured to receive messages from the network user 130.

The network user 130 may be characterized as having more influence than the other network users 131-133, because the network user 130 has more incoming edges than other network users 104. More specifically, the network user 130 is capable of influencing the network users 131 and 133 because the network users 131, 133 receive messages from the network user 130. In some embodiments, a level of influence for a network user is not only determined by a number of primary followers, but also a number of secondary followers (and tertiary followers, and so on). As will be described in greater detail below, the network user 130 may be labeled as an influential user if the network user has at least a designated level of influence.

Figure 3:
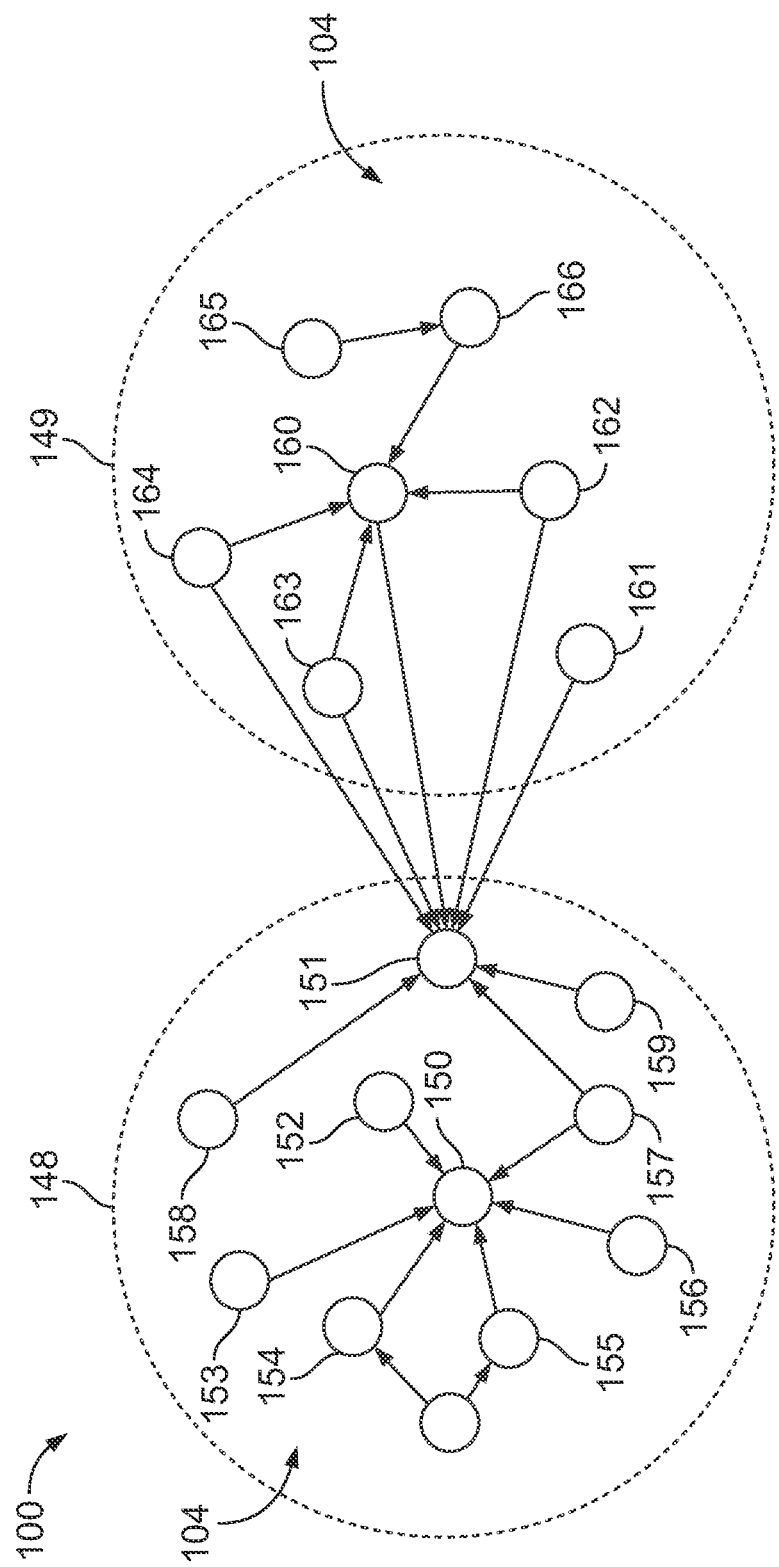
FIG. 3 illustrates a concept of topic-specific influence (TSI) in accordance with an embodiment.

FIG. 3 shows a limited number of network users 104 in the social network 100. The network users 104 include network users 150-159, which have been identified as being interested in a topic 148. The network users 104 also include network users 160-166, which have been identified as being interested in a topic 149. As shown, the topics 148 and 149 do not share any of the network users 150-159 and 160-166. FIG. 3 illustrates a concept called topic-specific influence (TSI), which may be distinguished from total network influence. Network influence may be based on, for example, a total number of followers that a network user has in the social network. On the other hand, TSI for a designated user is based on a number of network users that are (a) registered to receive the messages from the designated user (e.g., are followers of the designated user) and (b) interested in a designated topic.

For example, FIG. 3 demonstrates relative TSI for network users 150 and 151. As shown by the directed edges (or arrows), the network users 152-157 follow the network user 150, and the network users 157-159 follow the network user 151. The network users 150-159 are all interested users with respect to the topic 148. The network user 157 is a shared follower because the network user 157 follows both the network user 150 and the network user 151. Also shown in FIG. 3, the network user 151 is followed by network users 160-164. With respect to the topic 148, the network users 160-164 are non-interested users.

Accordingly, the network user 150 has a total of six followers. However, each of the six followers is an interested follower (i.e., 6/6 or 100%) of the topic 148. The network user 151 has a total of eight followers, which is more than the number of followers for the network user 150. However, the network user 151 has only three followers that are interested followers (i.e., 3/8 or 37.5%). The remaining followers are non-interested followers. In this illustration, the network user 151 has more total network influence than the network user 150. However, the network user 150 has more topic-specific influence or TSI than the network user 151. Thus, the network user 150 may be considered more influential with respect to the topic 148 than the network user 151 even though the network user 151 may have more followers. As will be described in greater detail below, a TSI value may be used to facilitate determining how related different topics are.

Figure 4:
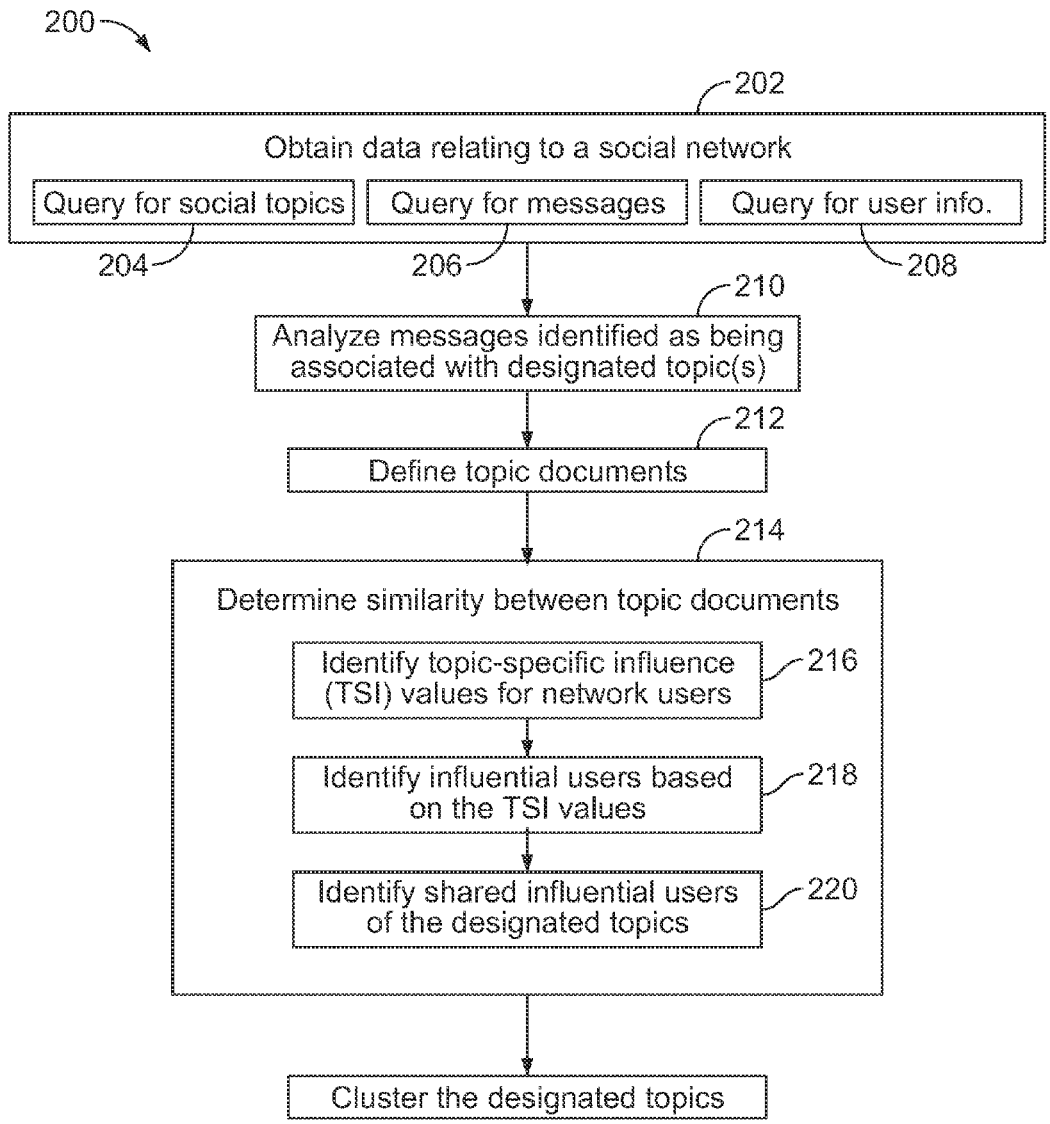
FIG. 4 is a flowchart showing a method of analyzing data from a social network in accordance with one embodiment.

FIG. 4 is a flowchart illustrating a method 200 of analyzing data relating to a social network. The method 200 may include obtaining at 202 data relating to or derived from the social network. In particular, the obtaining operation 202 may include obtaining user messages, user information about the network users that provided the user messages, and/or information about the social network (e.g., list of topics, including recent and/or popular topics, total traffic, and rate of messages being sent). The obtaining operation 202 may occur in real-time (e.g., immediately when the data is collected by the social network), a number of times within a designated time period (e.g., several times in a single day, once a day, once a week, etc.). The data may be also obtained at 202 when the data is desired or when certain conditions occur. For instance, the obtaining operation 202 may be triggered when, for instance, a designated topic becomes popular on the social network.

The obtaining operation 202 may include querying at 204 the social network (or another entity) having the desired data for social topics in the user messages. In particular, a designated number of the more popular social topics from a predetermined time period may be obtained. In some cases, the social network and/or a third party (e.g., whatthetrend.com, trendsmap.com, and the like) may track or monitor the social topics that are mentioned by users of the social network. Topics that are popular may be identified as, e.g., "trending topics." Topics may be popular if a threshold number of messages have been sent by network users within a predetermined time period. In some embodiments, the popularity of a topic is considered with respect to the entire social network (e.g., all network users). However, in other embodiments, the topics that are obtained may be popular to a designated subset of users. For example, the topics that are popular to network users in Chicago or to network users that are between the ages of 22-35 may be obtained. In alternative embodiments, the social topics obtained at 202 are not limited to popular topics but may include, for example, all social topics of the user messages that were sent within a predetermined time period.

The obtaining operation 202 may also include querying at 206 for messages that have been identified as being associated with designated topics. For example, the user messages that are associated with the top 1000 social topics from the past 24-hour period may be obtained. The obtaining operation 202 may also include querying at 208 for information relating to the users that provided the messages associated with the designated topics. For example, the user information obtained may include information about the other network users that are communicatively linked to the designated user. The user information about the other network users may be the number of user-friends and/or followers that the other network users have.

The method 200 also includes analyzing at 210 the messages that have been identified as being associated with designated topics. One or more embodiments described herein may use vector space modeling to perform operations that are similar to data mining. In the context of data mining, groups of messages related to a designated topic may be collectively viewed as a document (hereinafter referred to as a "topic document"). The analyzing operation 210 may include analyzing each topic document (e.g., analyzing each group of user messages that are related to the topic).

The method 200 also includes defining at 212 each topic document. In some embodiments, each topic document may be defined by the number of times a designated term (e.g., a word or phrase) is used in the topic document. The designated terms are derived from a document corpus, which is a collection of documents. In some embodiments, the document corpus may be the user messages in all of the topic documents. For example, if user messages relating to 1000 topics were obtained at 202 then 1000 topic documents were also obtained because the messages associated with a topic collectively define the topic document. The document corpus may include the distinct terms used in all of the user messages of all of the 1000 topic documents. However, a document corpus may be obtained in other manners and may be modified as desired. The document corpus may also be derived from a previously-prepared database of terms. For example, the document corpus may be derived from the Multi-Perspective Question Answering (MPQA) corpus.

More specifically, for each topic document, the defining operation 212 analyzes the textual content of the user messages in the topic document and, for various designated terms, counts the number of times a designated term is used. For example, the analyzing operation 210 may review 100 user messages in a topic document and determine that—out of all user messages in the topic document—the term "Super Tuesday" is used 86 times, the term "Mitt Romney" is used 74 times, and the term "primary" is used 120 times. The topic document may then be defined as a vector of identifiers that are associated with corpus terms:

$$d_I = [w_{t_1}, w_{t_2}, w_{t_3}, \ldots, w_{t_N}]$$

where $t_1$, $t_2$, $t_3$, are n corpus terms from the document corpus and $w_{t1}$, $w_{t2}$, ... $w_{tn}$ are weights associated with each of the corpus terms.

The weights $w_{t1}$, $w_{t2}$, ... $w_{tn}$ of the corpus terms may be based upon a number of times (or frequency) that the corpus term appears in a particular topic document. The weights $w_{t1}$, $w_{t2}$, ... $w_{tn}$ of the corpus terms may also be based on a number of topic documents in the document corpus that include the corpus term. In particular embodiments, the weights $w_{t1}$, $w_{t2}$, ... $w_{tn}$ of the corpus terms are determined using a term frequency-inverse document frequency (TF-IDF) weighting equation. A TF-IDF can be a numerical value that reflects how important a corpus term is to a topic document. For example, the TF-IDF weight equation used to determine the weights $w_{t1}$, $w_{t2}$, ... $w_{tn}$ may be:

$$w_{i,j} = tf_{i_j} * \log\left(\frac{N_d}{df_{i_j}}\right)$$

where $tf_{ij}$ represents the number of times the term $t_j$ occurred in document $d_i$; $N_d$ is the cardinality of the document corpus; and $df_{ij}$ indicates the number of documents in the document corpus where the term $t_j$ appears.

Accordingly, the defining operation 212 defines a plurality of topic documents that are each, in turn, defined by a corresponding vector. The topic document may be defined by a number of times each distinct term from a document corpus is used.

At 214, a similarity between the topic documents may be determined. In data mining, one similarity metric that may be used to define a similarity between two documents is cosine similarity. Cosine similarity is a measure of similarity between two vectors that is determined by measuring the cosine of an angle between the two vectors. As described above, the topic documents may be defined as vectors d. In this case, the vectors are topic documents as defined above. Thus, the cosine similarity between two topic documents $d_k$ and $d_j$ may be defined as:

$$\text{cosine\_similarity}(d_k, d_j) = \frac{d_k, d_j}{\|d_k\| * \|d_j\|} = \frac{\sum_{i=1}^{n} w_{k_{i_j}} * w_{j_{l_i}}}{\sqrt{\sum_{i=1}^{n} w_{k_{l_i}}^2 * \sum_{i=1}^{n} w_{j_{l_i}}^2}}$$

where $w_{k^{ti}}$, represents the weight of term $t_i$ in document $d_k$ obtained using the TF-IDF scheme described earlier.

However, determining a cosine similarity between two topic documents alone may have some limitations. For example, long documents may be poorly represented due to poor similarity values.

To address the limitations of using cosine similarity alone to compare two topic documents, one or more embodiments may determine a similarity in network users that have provided the messages associated with the two topics. If two topics share a number of network users, then the two topics may be considered to be more related than two topics that do not share any network users. In the context of determining similarity between two topic documents, a user similarity between two topic documents may be considered as a number of network users that are interested in both social topics that correspond to the two topic documents. By way of example, in some cases, network users may provide a message that is associated with topic A and also provide a message that is associated with topic B.

Accordingly, one or more embodiments described herein may determine a similarity metric between two topic documents using a model that is at least partially based on a user similarity between the two topic documents. In some embodiments, the similarity between two topic documents is based at least partially on a cosine similarity of the two topic documents and also based on a user similarity between the two topic documents. In more particular embodiments, the user similarity is based on a number of topic-specific influential users that are shared by the two topics.

To this end, the determining operation may include identifying at 216 topic-specific influence values of the network users for the designated topics. As described above, one or more embodiments may use vector space modeling. Let G=(V,E) represent the social network, such as the social network 100 (FIG. 2). V=$u_1$, $u_2$, ... $u_n$, is a set of vertices in the vector graph. With respect to the social network 100, the vertices $u_1$, $u_2$, ... $u_n$ correspond to network users 104 (FIG. 2). E is a set of directed edges, such as the edges 140-143 in FIG. 2. As described above, a directed edge extends from a follower to the network user being followed (e.g., user-friend). For example, in FIG. 2, the network user 131 is a follower of the network user 130. In some embodiments, each of the edges is configured to have an equal weight with respect to other edges.

As described above, topic-specific influence or TSI for a designated user is based upon a number of network users that are registered to receive messages from the designated user and that are also identified as being interested in a designated topic. Thus, in relation to vector graph modeling, the subgraph $G_t=V_t, E_t$ is considered in which $V_t$ represents a subset of network users that have been identified as being interested in a designated topic (e.g., the network users have sent messages that include marker of interests of the designated topic). TSI may not only be based upon a number of followers that are registered to receive messages from the designated user (e.g., followers), but TSI may also be affected by the influence that these followers have. For example, TSI may be affected by a number of user-friends and/or followers of each network user that follows the designated user. A topic-specific-rank (TSR) (also referred to as a TSI value) for a designated user u may be defined as:

$$TSR(u) = (1-d) + d \sum_{v \in follower(u)} TSR(u) * W^{in}_{(v,u)} * W^{out}_{(v,u)}$$

where $W^{in}_{(v,u)}$ and $W^{out}_{(v,u)}$ are weights computed for the edge (v,u) between users u and v in the graph, where v is a follower of u. The $W^{in}_{(v,u)}$ may be based on a number of followers of the designated user u and a number of followers of the network user v. The $W^{out}_{(v,u)}$ may be based on a number of user-friends of the designated user u and a number of user-friends of the network user v. In some embodiments, the weights $W^{in}_{(v,u)}$ nd $W^{out}_{(v,u)}$ are defined as:

$$W^{in}_{(v,u)} = \frac{\sum_{k \in followers(u)} weight_{(k,u)}}{\sum_{p \in friends(v)} \sum_{q \in followers(p)} weight_{(q,p)}}$$

$$W^{out}_{(v,u)} = \frac{\sum_{k \in friends(u)} weight_{u,k}}{\sum_{p \in friends(v)} \sum_{g \in friends(p)} weight_{(q,p)}}$$

where d is a damping factor, which is usually between 0 and 1 (e.g., 0.85); friends(u) represents a number of network users that the designated user u is registered to receive messages from; and followers(u) represents a number of network users that are registered to receive messages from the designated user u; and $weight_{u,k}$ represents the weight of the edge between user u and user k in the network graph. In the above equation, p and q are the coefficients for the respective sums. The denominator in the equation above can be understood as follows: For each p in friends(v) and for each q in friends(p), compute weight of the edge (q,p) and add to the denominator. In some embodiments, the dampening factor d may be considered the probability of a network user being influenced by another network user.

It should be noted that, in some embodiments, the TSR or TSI value may be affected by spam users of the social network. Spam users are network users that are operated by computer programs to send unsolicited messages to other network users. Typically, spam users send significantly more messages than other network users. Spam users may be configured to search for messages that relate to a designated topic and then send bulk messages to the network users that provided the messages about the designated topic. As one example, if a spam user determined that a network user was interested in buying a house, the spam user may send a message to the network user about real estate offerings.

Accordingly, in some embodiments, spam users may be determined by identifying the network users having a number of sent messages that exceed a designated cut-off. To diminish the TSI value of the spam user, the above-described weights $W^{in}_{(v,u)}$ and $W^{out}_{(v,u)}$ may be modified. For example, for each message that is sent by an identified spam user, a number of "friends" that the spam user may be incrementally increased. Increasing the number of user-friends reduces the TSI value of the spam user.

Accordingly, the TSI value for each network user that has been identified as interested in a designated topic may be determined. The determining at 214 may also include identifying at 218 the influential users from the interested users. The identifying operation 218 may include at least one of (a) identifying the interested users that have a TSI value that is greater than a designated cut-off value; (b) identifying the interested users that are within a designated range of TSI values; or (c) ranking the TSI values and identifying the interested users that are within a top group ranking of the interested users (e.g., within the top 5% of interested users).

The determining operation 214 may include determining a user similarity between two sub-sets of network users (e.g., between two different groups of network users that have been identified as interested in a designated topic). The user similarity may be determined by identifying at 220 a number of influential users that are shared by the two sub-sets (or topics). With reference again to FIG. 2, topic 108 and topic 110 share a total of six network users 104. If any of these network users 104 is identified as being an influential user of the topic 108 (e.g., a topic-specific influential user) and also of the topic 110 then the topics 108, 110 share those influential users. The number of topic-specific influential users that are shared by different topics may be used to determine a user similarity of the two documents. More specifically, a user similarity between two documents $t_i$ and $t_j$ may be defined as:

$$user\_similarity(t_i, t_j) = \frac{\left| U^s_{influencer_{t_i}} \cap U^s_{influencer_{t_j}} \right|}{s}$$

where $U^s_{influencers\ ti}$ is the set of s influential users of topic $t_i$ and $U^s_{influencers\ tj}$ is the set of s influential users of topic $t_j$.

As one example of the above equation, assume that topic A has a total of 20 influential users and topic B has a total of 75 influential users. Of these influential users, topics A and B share 15. Based on the user similarity equation above, the user similarity that topic A has with topic B is 15/20 (75%) and the user similarity that topic B has with topic A is 15/75 (20%). Accordingly, topic A has a stronger relation to topic B than topic B does to topic A.

In some embodiments, the determining at 214 may be based solely on the user similarity. One topic may be identified as being sufficiently related to another topic if the user similarity is greater than a designated threshold. For example, if the percentage of influential users shared by two topics is greater than 50%, the two topics may be characterized as being related.

However, in other embodiments, a similarity between topics may be determined at 214 by also using other similarity metrics. More specifically, a similarity between two topics may be determined by considering the cosine similarity between the two topics and the user similarity between the two topics, More specifically, a similarity S between two topics $t_1$ and $t_2$ may be defined as:

$$S(t_1,t_2)=\alpha^*\text{cosine\_similarity}(t_1,t_2)^*\text{user\_similarity}(t_1,t_2)$$

where $\alpha$ and $\beta$ are parameters that determine the relative effectiveness of cosine similarity and user similarity, respectively. In some embodiments, the value used for $\beta$ is greater than $\alpha$. Values for the parameters $\alpha$ and $\beta$ may be evaluated using top-k precision analysis and/or weighted top-k precision analysis.

In some embodiments, the user similarity may have a greater effect on the topic similarity S than the cosine similarity. In some embodiments, a $\beta$-value to $\alpha$-value ratio may be about 1.5:1 to about 20:1. In particular embodiments, the $\beta$-value to $\alpha$-value ratio may be about 3:1 to about 15:1. In more particular embodiments, the $\beta$-value to $\alpha$-value ratio may be about 4:1 to about 11:1. By way of one example, the $\beta$-value may be about 10 and the $\alpha$-value may be about 1. As another example, the $\beta$-value may be about 5 and the $\alpha$-value may be about 1. However, in other embodiments, the value used for $\beta$ is less than $\alpha$.

It should be noted that other similarity metrics may be used with the user similarity. For example, other similarity metrics may be used in place of the cosine similarity or in addition to the cosine similarity.

The method 200 may also include clustering at 220 the designated topics based on the similarity S. In data mining, document clustering is the process of determining separate groups or clusters of documents among numerous documents. These groups or clusters of documents may be referred to as cluster groups. In known clustering systems, a distance metric is used to group documents (represented as vectors) relative each other and define separate cluster groups. For example, k-means clustering is a method of cluster analysis that partitions the documents into k cluster groups in which the value for k may be designated or determined by a computing system. Given a set of n documents (e.g., $x_1, x_2, \ldots x_n$) to cluster, the k-means algorithm randomly selects cluster centers m. The algorithm then uses multiple iterations of two steps. More specifically, each iteration includes the step of determining the cluster center that a document is nearest to and then assigning the document to that cluster group. This may be represented as:

$$\text{Clusters}_i^t = x_j : \text{distance}(x_j, m_i^t) \leq \text{distance}(x_j, m_k^t) \forall k \text{ in } 1,2,3,\ldots k$$

To determine the cluster center that is nearest to a document, various distance functions may be used. A common distance function is the Euclidean distance. Determining a cosine similarity between two documents may also be used as a distance function.

After the assignment, a new cluster center is calculated for each cluster group. The new cluster center for one cluster group is most likely different from the original cluster center if documents were assigned to the cluster group and/or were reassigned to another cluster group. Calculating the new cluster center may be represented by:

$$m_i^{t+1} = \frac{1}{|\text{Clusters}_i^t|} \sum_{x_j \in \text{Clusters}_i^t} x_j$$

After calculating the new cluster center, additional iterations of the assignment and update operations may be repeated until convergence is achieved (e.g., until the documents are not reassigned).

As described above, the distance function that is used by conventional k-means clustering algorithms may include the Euclidean distance or the cosine similarity. However, one or more embodiments described herein may use a distance function that is based on the similarity S defined above that is partially based on user similarity. As described above, the similarity S between two documents may be represented as:

$$S(t_1,t_2)=\alpha^*\text{Cosine\_similarity}(t_1,t_2)+\beta^*\text{user\_similarity}(t_1,t_2)$$

A distance function can be derived from the above equation. For example, the distance function may be:

$$\text{Distance}=K-S=K-\alpha^*\text{cosine\_similarity}-\beta^*\text{user\_similarity}$$

where K, $\alpha$, and $\beta$ are parameters that may have designated values that are subject to change based on the application of the algorithm.

However, by using the above distance function that is based on user similarity, clustering analysis that includes calculating a new cluster center cannot be used. Accordingly, instead of designating a cluster center and calculating a new cluster center, a cluster representative of each cluster group may be assigned.

More specifically, the clustering algorithm may be similar to the above k-means clustering algorithm. For example, given a plurality of topic documents, k cluster representatives may be assigned randomly. Each cluster representative is one of the topic documents. A distance between each cluster representative and each other topic document may be calculated using the above distance function based on user similarity. Each of the topic documents is then assigned to the cluster representative that is nearest to the topic document. Similar to the above k-means clustering algorithm, the cluster representative may then be recalculated. However, the new cluster representative is determined by adding, for each topic document in a cluster group, a distance between the topic document and other topic documents in the cluster group. The topic document with the lowest distance is the new cluster representative. Once convergence is achieved, each cluster group includes a plurality of topics that may be characterized as related topics.

Figure 5:
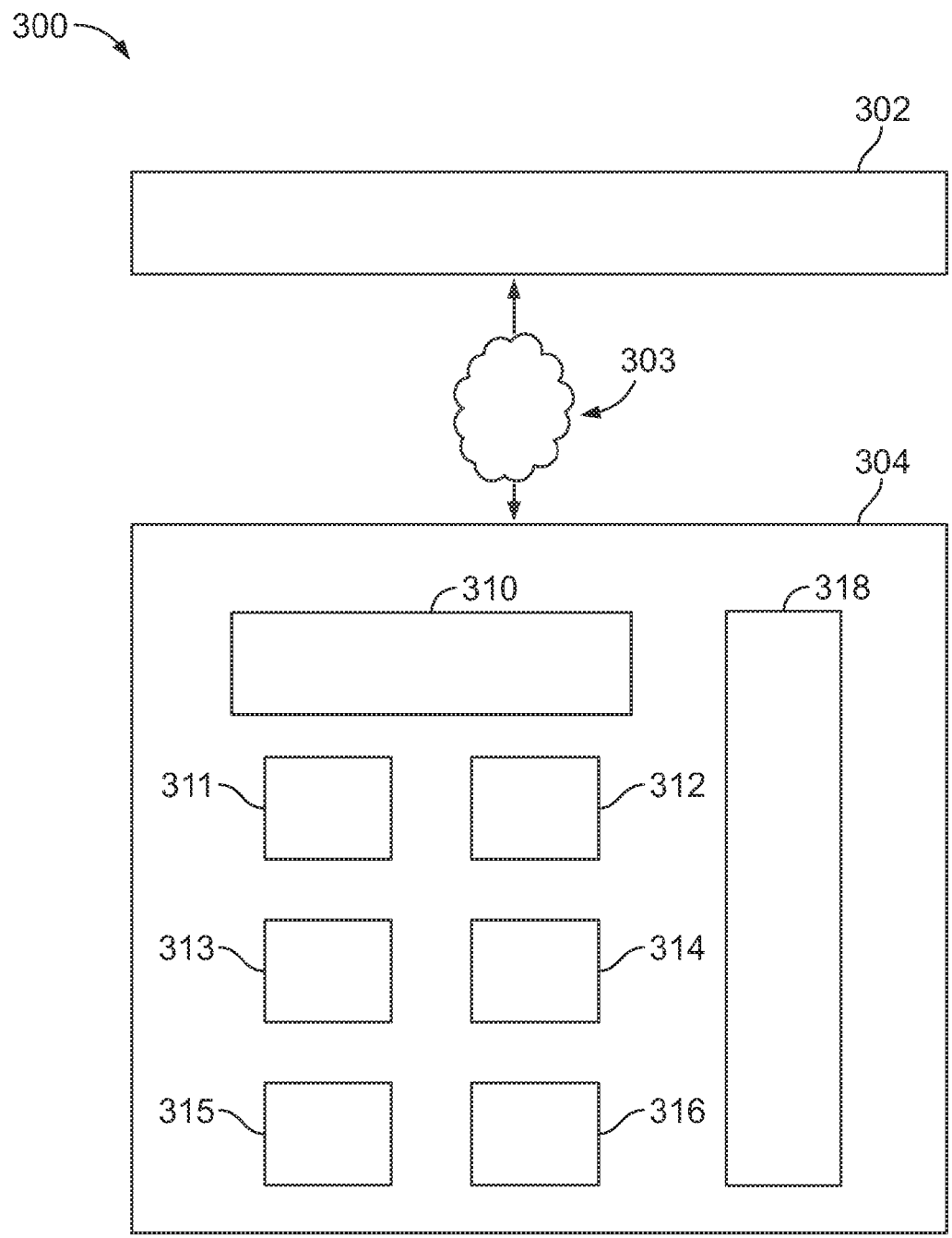
FIG. 5 illustrates a system in accordance with one embodiment that may be used to perform at least part of the method of FIG. 4.

FIG. 5 illustrates a schematic diagram of a networking system 300 according to one embodiment. As shown, the system 300 includes a social network data interface 302 and a data mining system 304. The data interface 302 may be communicatively coupled to the data mining system 304 through a communication network 303. The data interface 302 may be controlled by an online social network. Alternatively, the data interface 302 is operated by a third party that stores data from the online social network. In some embodiments, the data interface 302 may represent a plurality of interfaces in which at least one the interfaces is controlled by the social network and at least one other interface is controlled by a third party.

The data mining system 304 includes a server system (or sub-system) 310 that includes one or more servers. A plurality of modules 311-316 may perform, at the server system 310, one or more of the operations that have been described with respect to the method 200. Each of the above modules 311-316 may include an algorithm (e.g., instructions stored on a tangible and/or non-transitory computer readable storage medium coupled to one or more servers) or sub-algorithms to perform particular processes. The data mining system 304 may also include a database system 318 that stores data that may be used in the data analysis. The database system 318 may include one or more databases and is configured to communicate with the server subsystem 310 and the modules 311-316. Although the data mining system 304 appears one structure or apparatus in FIG. 5, the data mining system 304 may be formed from multiple interconnected subsystems that are located remotely from each other.

The modules 311-316 may include a data-collection module 311, an analysis module 312, a document-defining module 313, a topic-similarity module 314, and a clustering module 315. The data-collection module 311 is configured to obtain data related to the social network. The data-collection module 311 may communicate directly with the data interface 302. For example, the data-collection module 311 may request data regarding the social network through one or more APIs established by the social network. By way of example, the data-collection module 311 may obtain at least one of data regarding topics, data regarding user information (e.g., age, gender, sex, geographical location), or data regarding the messages provided by the network users.

The analysis module 312 is configured to analyze the data collected by the data-collection module 311. For example, the analysis module 312 may analyze the messages from the social network to identify any key words or markers in the messages and thereby classify/identify the message as being associated with a social topic. The document-defining module 313 may analyze different groups of messages in which each group is associated with a different topic. The document-defining module 313 may generate vectors that represent different topic-documents.

The topic-similarity module 314 may be configured to determine a similarity between different pairs of topic documents. The topic-similarity module 314 may be configured to perform the determining operation 214, including the operations 216, 218, and 220. For example, the topic-similarity module 314 may receive vector data from the document-defining module 313 that includes a vector for each one of the topic documents. More specifically, for each group of user messages that are classified as being associated with a corresponding topic, a vector may be generated. The topic-similarity module 314 may determine a cosine-similarity between the two topic documents as well as a user similarity between the two topic documents. As described above, the user similarity may be based on a number of topic-specific influential users that are shared by the two topics associated with the topic documents. The clustering module 316 is configured to cluster the topic documents thereby identifying different groups of related topics.

The various components and modules described herein may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer" or "module".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible, non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It should be noted that embodiments described herein do not require each and every operation to be performed in a method or by a processor or for each module to be included in a system.

Various aspects of the subject matter described herein are not directed solely to an abstract idea. For example, one or more embodiments described herein cannot reasonably be performed solely in the mind of a human being and may involve the use of tangible computational devices, such as computers, processors, controllers, and the like. At least one embodiment of a method described herein could not reasonably be performed within the mind of a person and/or without use of a computational device (e.g., could not be performed merely with a pencil and paper). For example, it would be commercially unreasonable for a person to mentally analyze numerous messages from a social network to identify different topics that share network users, consider the number of follower and user-friends that the shared network users have, and calculate a TSI value as described above. This is not commercially reasonable due to the relatively large number of messages and numerous different social topics. Instead, one or more embodiments described herein provide practical applications that identify topic-specific influential users and related topics. One or more embodiments described herein may be performed autonomously by a processor (or controller or other-logic based device) in order to significantly improve the accuracy and/or speed of determining topic-specific influential users and/or related topics relative to mentally performing the same tasks.

In accordance with another embodiment, a method (e.g., a method of analyzing data from an online social network having a set of network users, where the network users are capable of communicating with one another through the social network) is provided. The method includes obtaining messages sent by the network users. The messages have social content that includes at least one of textual terms or images provided by the network users. The messages include a marker of interest in the social content, where the marker of interest is associated with a topic of the social network. The method also includes identifying the network users that sent the messages having the marker of interest in the social content as interested users of the topic. The interested users are a subset of the set of network users. The method further includes determining a topic-specific influence (TSI) value of a designated user from the interested users in the subset. The TSI value of the designated user is based on a number of the interested users that are registered to receive the messages from the designated user.

In another aspect, the interested users that are registered to receive the messages from the designated user are primary users. The interested users also include secondary users that are registered to receive the messages from at least one of the primary users, wherein the TSI value is also based on a number of secondary users.

In another aspect, determining the TSI value includes determining the TSI values of other interested users in the subset.

In another aspect, the method also includes ranking the interested users based on the TSI values to generate a topic-specific ranking.

In another aspect, the method also includes identifying influential users from the interested users of the subset, the TSI values of the influential users being at least one of (a) greater than a designated cut-off value or (b) within a designated range of values; or (c) within a top group ranking of interested users.

In another aspect, the method also includes identifying the interested users that send an abnormal number of messages to network users as spam users. The TSI values of spam users are diminished relative to interested users that are not spam users.

In another aspect, the marker of interest includes a plurality of marker of interests and determining whether the messages include the marker of interest includes identifying the messages that include at least two of the marker of interests.

In another aspect, the marker of interest is a textual term that is actively tagged by the network user as the topic of the corresponding message.

In another embodiment, a system (e.g., a system configured to analyze data from an online social network having a set of network users, where the network users being capable of communicating with one another through the social network) is provided. The system includes an analysis module, an identification module, and a value-generating module. The analysis module is configured to analyze messages sent by the network users. The messages have social content that includes at least one of textual terms or images provided by the networks users. The messages include a marker of interest in the social content. The marker of interest is associated with a topic of the social network. The identification module is configured to identify the network users that sent the messages having the marker of interest in the social content as interested users of the topic. The interested users are a subset of the set of network users. The value-generating module is configured to determine a topic-specific influence (TSI) value of a designated user from the interested users in the subset. The TSI value of the designated user is based on a number of the interested users that are registered to receive the messages from the designated user.

In another aspect, the interested users that are registered to receive the messages from the designated user are primary users. The interested users also include secondary users that are registered to receive the messages from at least one of the primary users, wherein the TSI value is also based on a number of secondary users.

In another aspect, the value-generating module is configured to determine the TSI value of other interested users in the subset.

In another aspect, the value-generating module is configured to rank the interested users based on the TSI values to generate a topic-specific ranking.

In another aspect, the value-generating module is configured to identify influential users from the interested users of the subset. The TSI values of the influential users are at least one of (a) greater than a designated cut-off value or (b) within a designated range of values; or (e) within a top group ranking of interested users.

In another aspect, the marker of interest includes a plurality of marker of interests and the analysis module determines whether the messages include at least two of the marker of interests.

In another aspect, the marker of interest is a textual term that is actively tagged by the network user as the topic of the corresponding message.

In another embodiment, another method (e.g., a method of analyzing data from an online social network having a set of network users, where the network users are capable of communicating with one another through the social network) is provided. The method includes obtaining a plurality of topic documents that are associated with different social topics. Each of the topic documents has a plurality of messages from the network users of the social network. The messages have social content that includes at least one of textual terms or images provided by the networks users. The messages of each topic document are identified as relating to the social topic of the topic document. The method further includes assigning the topic documents to corresponding cluster groups, where the assigning for each of the topic documents is based on a user similarity of said topic document with the other topic documents. The user similarity is determined by a number of influential users that are shared by at least two topic documents.

In another aspect, the method also includes determining a cluster representative of each of the cluster groups. The cluster representative may be one of the topic documents in the corresponding cluster group.

In another aspect, the topic documents include at least 1000 topic documents.

In another embodiment, another system (e.g., a system configured to analyze data from an online social network having a set of network users, where the network users being capable of communicating with one another through the social network) is provided. The system includes a data-collection module and a clustering module. The data-collection module is configured to obtain a plurality of topic documents that are associated with different social topics. Each of the topic documents has a plurality of messages from the network users of the social network. The messages have social content that includes at least one of textual terms or images provided by the networks users. The messages of each topic document are identified as relating to the social topic of the topic document. The clustering module is configured to assign the topic documents to corresponding cluster groups. An assignment for each of the topic documents is based on a user similarity of the topic document with the other topic documents. The user similarity is determined by a number of influential users that are shared by at least two topic documents.

In another aspect, the clustering module determines a cluster representative of each of the cluster groups. The cluster representative may be one of the topic documents in the corresponding cluster group.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter described herein without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method of analyzing data from an online social network having a set of network users, the network users being capable of communicating with one another through the social network, the method comprising:
    obtaining messages sent by the network users, the messages having social content that includes at least one of textual terms or images provided by the network users, wherein the messages include a marker of interest in the social content, the marker of interest being actively tagged by a network user for a designated topic of the social network;
    identifying the network users that sent the messages having the marker of interest in the social content as interested users of the topic, the interested users being a subset of the set of network users; and
    determining, for the topic, a topic-specific influence (TSI) value of a designated user from the interested users in the subset, wherein the TSI value of the designated user is based on a number of the interested users that are registered to receive the messages from the designated user and who have separately expressed an interest in the topic.

2. The method of claim 1, wherein the interested users that are registered to receive the messages from the designated user are primary users, the interested users also including secondary users that are registered to receive the messages from at least one of the primary users, wherein the TSI value is also based on a number of secondary users.

3. The method of claim 1, wherein determining the TSI value for the topic includes determining the TSI values of other interested users in the subset.

4. The method of claim 3, further comprising ranking the interested users based on the TSI values to generate a topic-specific ranking.

5. The method of claim 3, further comprising identifying influential users from the interested users of the subset, the TSI values of the influential users being at least one of (a) greater than a designated cut-off value or (b) within a designated range of values; or (c) within a top group ranking of interested users.

6. The method of claim 3, further comprising identifying the interested users that send an abnormal number of messages to network users as spam users, the TSI values of spam users being diminished relative to interested users that are not spam users.

7. The method of claim 1, wherein the marker of interest includes a plurality of marker of interests and wherein the determining whether the messages include the marker of interest includes identifying the messages that include at least two of the marker of interests.

8. The method of claim 1, wherein the marker of interest is a textual term that is actively tagged by the network user as the topic of the corresponding message.

9. A system configured to analyze data from an online social network having a set of network users, the network users being capable of communicating with one another through the social network, the system comprising:
    an analysis module configured to analyze messages sent by the network users, the messages having social content that includes at least one of textual terms or images provided by the networks users, the messages including a marker of interest in the social content, the marker of interest being actively tagged by a network user for a designated topic of the social network;
    an identification module configured to identify the network users that sent the messages having the marker of interest in the social content as interested users of the topic, the interested users being a subset of the set of network users; and
    a value-generating module configured to determine a topic-specific influence (TSI) value of a designated user from the interested users in the subset, wherein the TSI value of the designated user is based on a number of the interested users that are registered to receive the messages from the designated user and who have separately expressed an interest in the topic.

10. The system of claim 9, wherein the interested users that are registered to receive the messages from the designated user are primary users, the interested users also including secondary users that are registered to receive the messages from at least one of the primary users, wherein the TSI value is also based on a number of secondary users.

11. The system of claim 9, wherein the value-generating module is configured to determine the TSI value of other interested users in the subset.

12. The system of claim 11, wherein the value-generating module is configured to rank the interested users based on the TSI values to generate a topic-specific ranking.

13. The system of claim 11, wherein the value-generating module is configured to identify influential users from the interested users of the subset, the TSI values of the influential users being at least one of (a) greater than a designated cut-off value or (b) within a designated range of values; or (c) within a top group ranking of interested users.

14. The system of claim 9, wherein the marker of interest includes a plurality of marker of interests and wherein the analysis module determines whether the messages include at least two of the marker of interests.

15. The system of claim 9, wherein the marker of interest is a textual term that is actively tagged by the network user as the topic of the corresponding message.

16. A method of analyzing data from an online social network having a set of network users, the network users being capable of communicating with one another through the social network, the method comprising:

obtaining a plurality of topic documents that are associated with different social topics, each of the topic documents having a plurality of messages from the network users of the social network, the messages having social content that includes at least one of textual terms or images provided by the networks users, the messages including a marker of interest in the social content, the marker of interest being actively tagged by the network users for the social content, wherein the messages of each topic document having the marker of interest are identified as relating to the social topic of the topic document; and assigning the topic documents to corresponding cluster groups for the social topic, wherein the assigning operation for each of the topic documents is based on a user similarity of said topic document with the other topic documents, the user similarity being determined by a percentage number of influential users being greater than a determined percentage that are shared by at least two for the topic documents to correspond to the cluster groups.

17. The method of claim 16, further comprising determining a cluster representative of each of the cluster groups, the cluster representative being one of the topic documents.

18. The method of claim 16, wherein the topic documents include at least 1000 topic documents.

19. A system configured to analyze data from an online social network having a set of network users, the network users being capable of communicating with one another through the social network, the system comprising:

a data-collection module configured to obtain a plurality of topic documents that are associated with different social topics, each of the topic documents having a plurality of messages from the network users of the social network, the messages having social content that includes at least one of textual terms or images provided by the networks users, the messages including a marker of interest in the social content, the marker of interest being actively tagged by the network users, wherein the messages of each topic document having the marker of interest are identified as relating to the social topic of the topic document; and a clustering module configured to assign the topic documents to corresponding cluster groups, wherein an assignment for each of the topic documents is based on a user similarity of said topic document with the other topic documents, the user similarity being determined by a percentage number of influential users being greater than a determined percentage that are shared by at least two for the topic documents to correspond to the cluster groups.

20. The system of claim 19, wherein the clustering module determines a cluster representative of each of the cluster groups, the cluster representative being one of the topic documents.

* * * * *